United States Patent [19]

Popeil et al.

[11] 4,077,123
[45] Mar. 7, 1978

[54] KNIFE FOR A FLAT CUTTING SURFACE

[75] Inventors: Samuel J. Popeil; Lorenzo Anthony Ruiz, both of Chicago, Ill.

[73] Assignee: Popeil Brothers, Inc., Chicago, Ill.

[21] Appl. No.: 749,607

[22] Filed: Dec. 13, 1976

Related U.S. Application Data

[62] Division of Ser. No. 683,479, May 5, 1976; Pat. No. 4,015,330.

[51] Int. Cl.² .............................................. B26B 3/02
[52] U.S. Cl. ...................................................... 30/286
[58] Field of Search ................ 30/286, 295, 343, 340, 30/296 R; 145/61 R, 61 C, 108 R

[56] References Cited

U.S. PATENT DOCUMENTS

| 527,175 | 10/1894 | Hurd | 30/286 |
|---|---|---|---|
| 3,347,292 | 10/1967 | Morgan | 145/108 R |

Primary Examiner—Jimmy C. Peters
Attorney, Agent, or Firm—Dominik, Knechtel, Godula & Demeur

[57] ABSTRACT

A cutting board case and knife set is shown in which the cutting board comprises two halves, folded along a center line, and secured together by means of a sliding bolt type latch. The two halves are hinged, and each half has a knife handle recess which accommodates one half of the handle of the knife, the cutting blade extending longitudinally adjacent the center fold portion of the cutting board. The two halves of the cutting board, when folded together, have a releasable lock and provision may be made for a hanging handle, and also for stopper buttons on the base used to secure the same against dislodgement. The forward end of the cutting board is tapered, and the preferred knife handle is kidney shaped with a flat base for guiding the same along the cutting board, a finger guide at its forward portion, and a central open grip.

7 Claims, 10 Drawing Figures

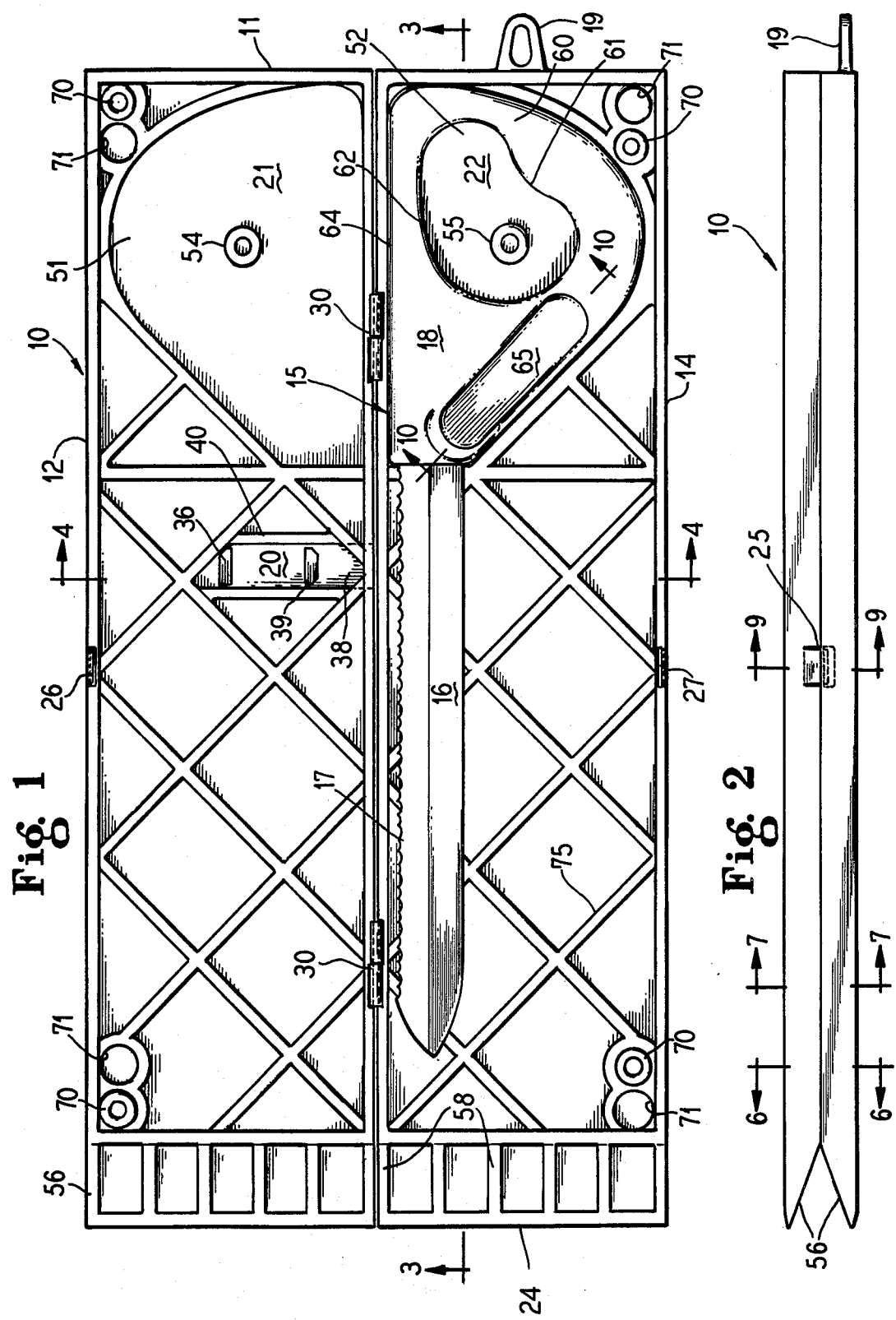

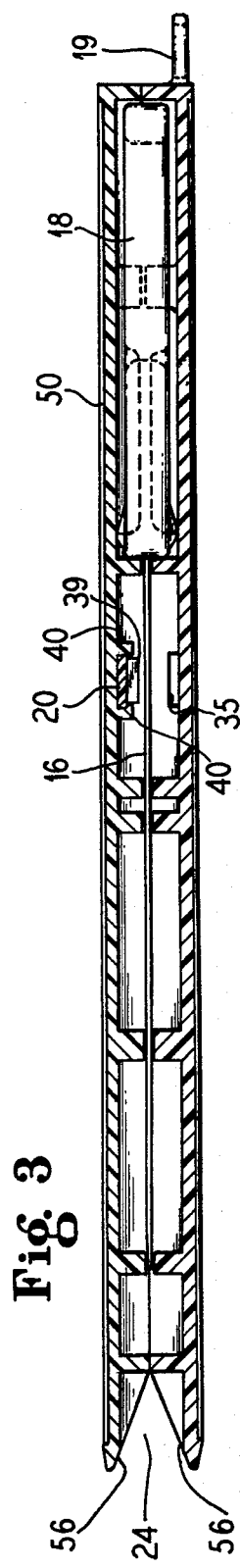
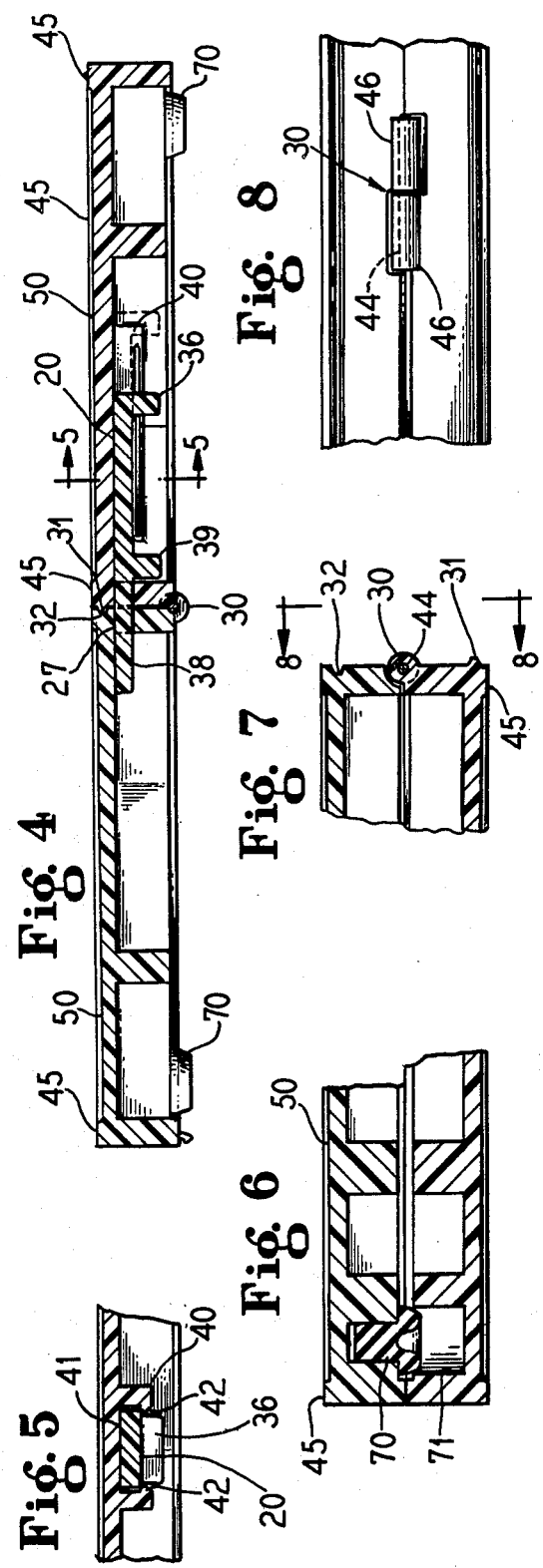
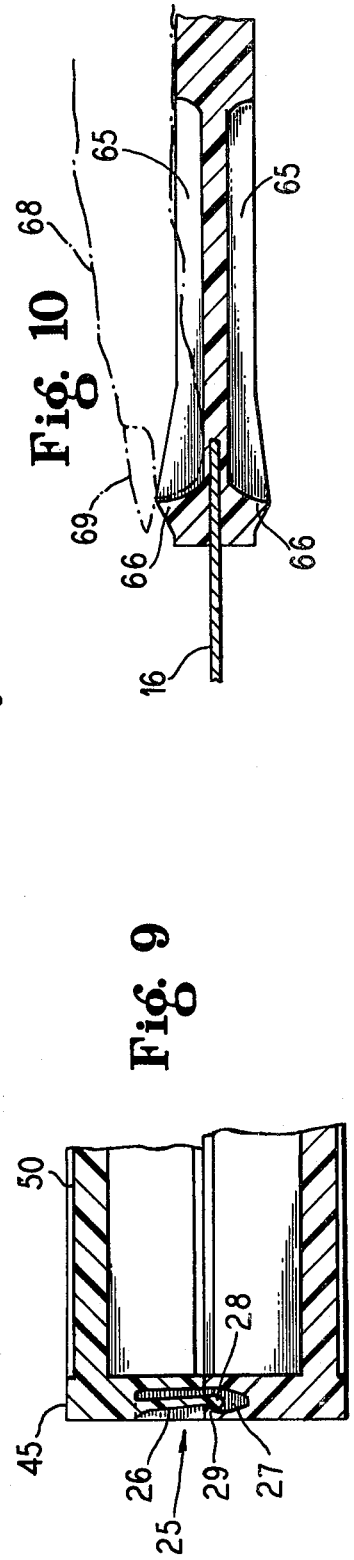

KNIFE FOR A FLAT CUTTING SURFACE

This is a division of application Ser. No. 683,479 filed May 5, 1976 now U.S. Pat. No. 4,015,330 issue date Apr. 5, 1977.

The subject invention relates to knives and more particularly knives to be utilized in combination with a flat cutting surface.

PRIOR ART

Cases for knives have been known for years, and many a carving set in the modern kitchen and dining room is kept in such a case. The case has little or no utility apart from providing a resting place, away from fingers and other cutlery, while the carving set is not in use. Hunting knives are well known and carried often times in leather cases. Cutting boards, on the other hand, take a wide variety of configurations, some with handles, and some without. Other cutting boards are built into kitchen counter tops. Wooden cutting boards often slide in and out beneath the kitchen counter top. Such cutting boards may or may not be easily cleansed through a trip to the dishwasher. Even though thin in cross-section, a cutting board is wide and normally occupies either a substantial space on the kitchen wall, or in a kitchen drawer, or in a slide as just discussed beneath the countertop. Cutting boards and knives find themselves used in combination without matching the set. In addition, the knife is normally kept at one location, and the cutting board at another thus requiring the homemaker to reach into a drawer which may have other knives, and thereby cause the risk of damage to the knife edge by contacting other metal surfaces, and also impose the risk of fingers being cut while dislodging the particular knife chosen at the time from other kitchen utensils.

SUMMARY

The subject knife for flat cutting surfaces is characterized by a blade portion and a handle portion integrally connected to the blade portion. The handle portion has a closed central grip portion, and a flat base disposed in parallel offset spaced relation to the knife cutting edge so that the knife can cuttingly engage in parallel relationship the flat cutting surface. The closed central grip portion has an elongated configuration with its longitudinal axis forming an acute angle with the longitudinal axis of the blade. Furthermore, one end of the grip portion is disposed adjacent to the intersection of the flat base and the side of the handle portion opposite the side connected to the blade portion whereby this alignment of the central grip portion provides a grip capable of transferring a sizeable torque to the blade portion. Also, the handle portion has a kidney shaped configuration with part of this kidney shaped configuration including a curved surface arranged in palm receiving disposition. A finger knob is formed in the longitudinal side of the grip portion adjacent the palm receiving curved surface, whereby the finger knob assists in establishing a firm grip. Also, the handle portion has opposed finger recesses formed therein which act as a finger guide. It should be noted that the knife handle is equally adaptable to the hand of a left handed or a right handed user.

An object of the present invention is to provide a cutting board with a knife configuration that assists in using the same on a flat surface, such as a cutting board, with the cutting portion of the knife in close proximity to the working surface of the cutting board.

DESCRIPTION OF DRAWINGS

Further objects and advantages of the present invention will become aparent as the following description of an illustrative embodiment proceeds, taken in conjunction with the accompanying drawings in which:

FIG. 1 is a view of the subject cutting board case and knife with the two halves opened, and with the cutting surface of the cutting board positioned downwardly thereby revealing the position of the knife when nested within the cutting board as a case.

FIG. 2 is a view of one edge of the cutting board case and knife set when the same are releaseably secured in the closed configuration, and showing the releaseable lock or snap assembly facing the viewer.

FIG. 3 is a longitudinal transverse sectional view of the closed cutting board case and knife taken generally along section line 3—3 of FIG. 1, and in the same scale thereof, but showing the case closed in the configuration revealed in FIG. 2.

FIG. 4 is a transverse sectional view taken along section line 4—4 of FIG. 1 and in the same scale as shown there.

FIG. 5 is an enlarged partially broken sectional view through the latch means taken along section line 5—5 of FIG. 4.

FIG. 6 is a further enlarged partially broken transverse sectional view taken along section line 6—6 of FIG. 2 showing the stopper button and its relationship to its opposed button pocket.

FIG. 7 is a further enlarged partially broken transverse sectional view taken along section line 7—7 of FIG. 2 illustrating the construction of the hinge which joins the two edges and the drip bead configuration.

FIG. 8 is a broken front elevation and enlarged section of the hinge construction taken from the vantage point of 8—8 of FIG. 7.

FIG. 9 is a further enlarged transverse sectional view of the snap or releaseable lock assembly taken along section line 9—9 of FIG. 2.

FIG. 10 is an enlarged partially diagramatic broken view of the knife handle illustrating the finger guides and other elements of the knife handle construction of the knife generally shown in plan view in FIG. 1.

DESCRIPTION OF PREFERRED EMBODIMENT

For the best understanding of the relationship between the elements of the cutting board case and knife assembly 10, the same is shown in its open position in FIG. 1, as it would be by the user when removing the knife 15 from the cutting board case and knife 10. The cutting board 11 is made up of two halves, a bolt half 12 and a latch 14, the same being secured together by means of a hinge assembly 30 at the center portion of each. The knife 15, has a blade 16 and is shown with the preferable cutting edge 17 in the form of a serrated hollow ground double ground edge. The handle 18, as shown, includes a kidney shaped handle grip 60, having a closed handle opening 62. The details of the configuration of the handle 18, including the preferred material will be described in greater detail hereinafter.

To be noted, are the complementary recesses 21, 22 for the handle, in which the recesses 21, 22 have the configuration of the handle 18. While the handle has been shown in kidney shaped form herein, it will be appreciated that other handle configurations may be employed, including the typical longitudinal handle with knuckle grip portions, and in such a situation, the recesses 21, 22 are modified to conform to the same for being complementarily retained within the cutting board case 10. Also to be noted in FIGS. 1 and 2 is the provision of a hanger 19 by means of which the cutting board case and knife assembly 10 may be hung on a nail, hook, or other extension off of a vertical surface.

In order to secure the bolt half and latch half 12, 14 of the cutting board 11, a bolt 20 (see again FIG. 1) is provided, the bolt having a finger tab 36, and a bolt tongue 38, by means of which the finger tab 36 is actuated and the bolt tongue 38 extends into a latch pocket 35. More specifically, to be noted in conjunction with FIGS. 4 and 5, the bolt 20 is snap fittingly engaged within a bolt guide 40, having a channel 41 for receiving the same, and rails 42 for retaining the bolt 20 within the bolt guide 40. The bolt stop 39 engages a lateral edge of the bolt half 12 of the cutting board 11, when the bolt tongue 38 is fully nested within the latch pocket 27 (see FIG. 4). At this point the bolt tongue 28 completely penetrates the latch pocket 27, and its upper surfaces engages the underneath surface of the latch half 14 of the cutting board 11, thereby securing the same in locked cutting configuration. When this particular assembled relationship is achieved by actuating the bolt 20, as will be observed in FIG. 4, the drip bead 31 press fittingly engages the drip groove 32 opposite it, to seal the same from dripping juices and the like. The disengaged relationship between the drip bead 31 and drip groove 32 are shown in FIG. 7. Also to be noted in FIGS. 7 and 8, is the configuration of the hinge assembly 30 which is made up of a pair of hinge collars 46 which are semi-circularly exposed (see FIG. 7) and secured each to the other by means of the hinge pin 44. A drip rail 45 is provided around the perimeter of the cutting surface 50, and is also provided at the two adjacent faces of the bolt half 12 and latch half 14 of the cutting board, immediately above the drip bead and drip groove assembly 31, 32 and running down the center of the unit.

When the cutting board case and knife assembly 10 are closed, the closure is effected by the snap assembly 25, best shown in its details in FIG. 9. There it will be seen that a leaf latch 26 is provided for snapping into a leaf latch pocket 27. The two elements are inter-connected by means of the leaf latch hook 28 and the pocket hook 29 which overlappingly engage each other as shown in FIG. 9. The scoop end 24 (see FIGS. 1 & 2) define a scoop edge 56 with a V shaped space therebetween as shown in FIG. 2. In the event the fingers are wet, and it is difficult to dislodge the snap assembly 25, the fingers can be inserted in the V shaped groove 56 defined at the end of the case 10 when the same is closed, and pressed to the end that the snap assembly 25 disengages and the unit can be opened to its configuration as shown in FIG. 1 for removal of the knife.

Some of the additional details of construction are illustrated in FIG. 1 where it will be seen that the recess bases 51, 52 of the handle recesses 21, 22 are provided with support posts 54, 55 which will engage the flat counter surface upon which the cutting board 11 is placed in the event pressure is applied to the base sections 51, 52. The cutting board 11 is further reinforced by means of the lattice webbing 75 defining a plurality of square pockets in the underneath portions of the bolt half 12 and latch half 14 of the cutting board 11. In addition, the scoop end 24 is reinforced by means of a plurality of scoop ribs 58 so that the cutting board can be pushed against various loose foodstuffs and the same, often times in cooperation with the cutting knife 15, used to position the foodstuffs atop the cutting surface 50 of the cutting board 11. In addition, a plurality of stopper buttons, preferably rubber or similar material, are positioned at the four corners of the underneath side of the cutting board 11, and when closed, are engaged by adjacent end opposed button pockets 71, this relationship being as shown in detail in FIG. 6.

In the preferred embodiment of the cutting knife 15, the handle 18 is kidney shaped, as shown in FIG. 1. The handle is provided with a finger knob 61 which assists in gripping the handle grip portion 60. A flat base guide 64 is provided at the lower portion of the handle 18, and moves back and forth as a base on the cutting surface 50 when used. A pair of opposed finger guides 65 (see FIG. 1 and FIG. 10) are provided so that the finger 68 (see particularly FIG. 10 in phantom lines) fits within the finger guide 65, and the finger nail 69 can extend over the top of the raised ends 66 of the finger guides 65. To be further noted is that the knife handle 18 is equally adaptable to the hand of a left handed or a right handed user.

In manufacture, the blade 16 is preferably an 8 inch stainless steel blade having a thickness of approximately 0.050 inches. The cutting edge is known by the trademark Vari-Wave which continues to about the forward end of the knife radius, and terminates at the junction with the knife handle 18. The knife is preferably double hollow ground, and as shown has a serrated edge, but straight edge knives are also contemplated.

As referred to above, the cutting board 11 is preferably molded from high density polyethylene since it is soft enough to permit long life of the cutting edge of the knife 16. In addition, this plastic can be safely washed in a dishwasher, and the same is approved by the U.S. Department of Agriculture with respect to bacterial contamination. In addition, the memory of polypropylene is such that even if cuts are made in the cutting surface, the same will close upon usage. Preferably the upper face of the cutting surface 15 is pebble grained to prevent thinly sliced foodstuffs from sticking to the same by means of their related surface tensions. The knife handle, on the other hand, preferably molded of polypropylene, because the same is more rigid than polyethylene, and will accommodate greater temperature extremes as in the dishwasher, or adjacent a cooking surface where the knife may be inadvertently positioned.

Also to be noted is that the hinge assembly 30 (see FIG. 4) is dimensioned so that the same will not engage the adjacent counter surface, but rather the stopper buttons 70 engage the same. Also, from a standpoint of proportion, the elements of the hinge assembly are provided to provide a stop at the two ends of the cutting board halves 12, 14, as will be noted from FIG. 7. This abutting relationship of the ends, reinforced by means of the bolt 20, secure the cutting board 11 in a flat configuration for use as described.

In review it will be seen that a cutting board case and knife assembly 10 have been disclosed and described in which the knife 15 is carried within the two halves 12, 14 of the cutting board 11 when the same is out of use. This confers the twofold advantage of safety of the knife, and compaction of the cutting board for storage. In addition, the knife is protected from damage by other elements, and yet ready for immediate use when the cutting board is to be used since opening the cutting board 11 simultaneously exposes the knife 15 for its removal, and use. The elements can be readily molded from economically high engineered plastics which offer resistance to bacterial contamination, and ready cleansing through the household dishwasher.

Although particular embodiments of the invention have been shown and described in full here, there is no intention to thereby limit the invention to the details of such embodiments. On the contrary, the intention is to cover all modifications, alternatives, embodiments, usages and equivalents of a cutting board case and knife set as fall within the spirit and scope of the invention, specification and the appended claims.

What is claimed is:

1. A knife to be used in combination with a flat cutting surface comprising:
   a blade portion;
   a handle portion integrally connected to said blade portion;
   a flat base on said handle portion;
   said flat base in parallel relation to the knife cutting edge, whereby said knife can cuttingly engage in parallel relationship the flat cutting surface;
   said handle portion having a closed central grip portion;
   said closed central grip portion having an elongated configuration with its longitudinal axis forming an acute angle with the longitudinal axis of said blade, one end of said grip portion disposed adjacent to the intersection of said flat base and the side of said handle portion opposite the side connected to said blade portion, whereby said alignment of said central grip portion provides a grip capable of transferring a sizeable torque to the blade portion.

2. A knife as in claim 1, further characterized by:
   said handle portion having opposed finger recesses.

3. A knife as in claim 1, further characterized by:
   said handle portion having a kidney shaped configuration;
   part of said kidney configuration including a curved surface arranged in palm receiving disposition.

4. A knife as in claim 3, further characterized by:
   a finger knob formed in the longitudinal side of said grip portion adjacent said palm receiving curved surface, whereby said finger knob assists in establishing a firm grip.

5. A knife as in claim 3, further characterized by:
   said handle portion having opposed finger recesses.

6. A knife as in claim 1, further characterized by,
   said flat base being in spaced parallel relationship to the planar extension of said knife cutting edge.

7. A knife as in claim 1, further characterized by,
   said flat base being coincident to the planar extension of said knife cutting edge.

* * * * *